(12) United States Patent
Hillebrecht et al.

(10) Patent No.: US 8,206,027 B2
(45) Date of Patent: Jun. 26, 2012

(54) USE OF AN APPARATUS FOR ADDING AT LEAST ONE ADDITIVE TO A REACTOR INTERIOR

(75) Inventors: Annemarie Hillebrecht, Mannheim (DE); Uwe Stüven, Bad Soden (DE); Leo Van Miert, Antwerp (BE); Dominicus van Esbroeck, Belgium (NL); Bernd Brian, Dirmstein (DE); Siegfried Chszaniecki, Hannover (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 783 days.

(21) Appl. No.: 11/994,138

(22) PCT Filed: Jul. 3, 2006

(86) PCT No.: PCT/EP2006/063787
§ 371 (c)(1),
(2), (4) Date: Jun. 3, 2008

(87) PCT Pub. No.: WO2007/003619
PCT Pub. Date: Jan. 11, 2007

(65) Prior Publication Data
US 2009/0008220 A1 Jan. 8, 2009

(30) Foreign Application Priority Data
Jul. 4, 2005 (DE) .......................... 10 2005 031 114

(51) Int. Cl.
*B01F 13/00* (2006.01)
(52) U.S. Cl. ..... 366/348; 366/76.3; 366/76.4; 366/76.6; 366/91; 366/142; 366/152.2; 366/156.2; 366/157.4

(58) Field of Classification Search ................. 366/76.3, 366/76.4, 76.6, 91, 142, 152.2, 156.1, 156.2, 366/157.4
See application file for complete search history.

(56) References Cited

U.S. PATENT DOCUMENTS
3,452,865 A    7/1969    Eckhardt
(Continued)

FOREIGN PATENT DOCUMENTS
CN    1103046 A    5/1995
(Continued)

OTHER PUBLICATIONS
International Search Report in PCT/EP2006/063787 dated Sep. 12, 2006.

*Primary Examiner* — Walter D Griffin
*Assistant Examiner* — Timothy Cleveland
(74) *Attorney, Agent, or Firm* — Marshall, Gerstein & Borun LLP

(57) ABSTRACT

The invention relates to the use of an apparatus for adding at least one solid or viscous liquid additive, or an additive dispersed in solvent, to a reactor interior of a reactor for preparing crosslinked, finely divided polymers by copolymerizing
(a) water-soluble, monoethylenically unsaturated monomers and
(b) from 0.001 to 5 mol %, based on the monomers (a), of monomers comprising at least two polymerizable groups,
(c) from 0 to 20 mol %, based on the monomers (a), of water-insoluble monoethylenically unsaturated monomers,
where the apparatus comprises at least one screw for conveying the at least one additive and the at least one screw ends in an addition orifice substantially flush with the inner wall of the reactor interior.

21 Claims, 2 Drawing Sheets

U.S. PATENT DOCUMENTS

| | | | |
|---|---|---|---|
| 3,704,866 A * | 12/1972 | Mosher et al. | 366/80 |
| 4,250,292 A | 2/1981 | Niederdellmann et al. | |
| 5,261,743 A * | 11/1993 | Moller | 366/76.3 |
| 5,407,266 A | 4/1995 | Dotsch et al. | |
| 5,513,737 A * | 5/1996 | Morimoto et al. | 193/12 |
| 5,644,007 A | 7/1997 | Davidson et al. | |
| 5,873,654 A * | 2/1999 | Lu | 366/156.2 |
| 6,710,141 B1 | 3/2004 | Heide et al. | |
| 2004/0186229 A1 | 9/2004 | Heide et al. | |

FOREIGN PATENT DOCUMENTS

| | | |
|---|---|---|
| CN | 1391582 A | 1/2003 |
| EP | 0 517 068 | 12/1992 |
| JP | 2003-326147 A | 11/2003 |
| WO | WO-01/38402 | 5/2001 |
| WO | WO-2004/022608 | 3/2004 |

\* cited by examiner

USE OF AN APPARATUS FOR ADDING AT LEAST ONE ADDITIVE TO A REACTOR INTERIOR

CROSS-REFERENCE TO RELATED APPLICATIONS

This is the U.S. national phase application of International Application No. PCT/EP2006/063787, filed Jul. 3, 2006, which claims the benefit of German Patent Application No. 10 2005 031 114.8, filed Jul. 4, 2005.

The invention relates to the use of an apparatus for adding at least one solid or viscous liquid additive, or an additive dispersed in solvent, to a reactor interior of a reactor for preparing crosslinked, finely divided polymers.

Crosslinked finely divided polymers are generally prepared in kneading reactors. Such a kneading reactor having at least two axially parallel rotating shafts, on whose surfaces disk faces with kneading bars arranged on their periphery are provided, is known, for example, from EP-A 0 517 068. The kneading bars are arranged such that those on one shaft mesh into those on the other shaft. Depending on the rotary speed of the shafts, which may be different, the number of kneading bars on the shafts may vary. For example, at a rotary speed ratio of 1:4, for example, 8 kneading bars are arranged on the main shaft over the periphery and 2 kneading bars on the second shaft designated as a cleaning shaft, which rotates four times more rapidly than the main shaft. In the mixing kneader known from EP-A 0 517 068, all reactants required for the preparation of the polymer are added via one introduction nozzle.

WO-A 2004/022608 discloses the use of a kneading reactor with two rotatably mounted shafts on whose surfaces are arranged kneading bars for preparing superabsorbents. Superabsorbents are polymer gels. The polymerization is carried out either in a homogeneous aqueous monomer solution or in a heterogeneous water-in-oil mixture. As a result of the use of the kneading reactor as the polymerization reactor, small gel particles are prepared.

WO-A 01/38402 likewise discloses a process for continuously preparing crosslinked finely divided polymer gels. In this case, the reaction is carried out in a kneading reactor with at least two axially parallel rotating shafts, a plurality of kneading and transport elements which bring about conveying of the substances added at the start of the kneading reactor in the axial direction toward the end of the mixer being disposed on the shafts.

In none of the kneading reactors known from the prior art is it possible to feed further components at another position in the kneading reactor in the course of the reaction.

It is an object of the invention to add additives at any position in the reactor in such a way that they can be metered in in any amounts without blockage and that no caking or lumping forms at the introduction points.

The object is achieved by the use of an apparatus for adding at least one solid or viscous liquid additive, or an additive dispersed in solvent, to a reactor interior of a reactor for preparing crosslinked, finely divided polymers by copolymerizing
(a) water-soluble, monoethylenically unsaturated monomers and
(b) from 0.001 to 5 mol %, based on the monomers (a), of monomers comprising at least two polymerizable groups,
(c) from 0 to 20 mol %, based on the monomers (a), of water-insoluble monoethylenically unsaturated monomers, where the apparatus comprises at least one screw for conveying the at least one additive and the at least one screw ends in an addition orifice substantially flush with the inner wall of the reactor interior.

Water-soluble monoethylenically unsaturated monomers of group (a) are, for example, ethylenically unsaturated $C_3$- to $C_6$-carboxylic acids, amides thereof and esters thereof with amino alcohols of the formula

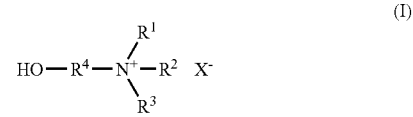

in which $R^4$ is $C_2$- to $C_5$-alkylene and $R^1$, $R^2$, $R^3$ are each independently hydrogen, methyl, ethyl or propyl. These compounds are, for example, acrylic acid, methacrylic acid, crotonic acid, itaconic acid, maleic acid, fumaric acid, and the alkali metal or ammonium salts of these acids, acrylamide, methacrylamide, crotonamide, dimethylaminoethyl acrylate, diethylaminoethyl acrylate, dimethylaminopropyl acrylate, dimethylaminobutyl acrylate, diethylaminoethyl methacrylate, dimethylaminoethyl methacrylate, dimethylaminopropyl methacrylate, dimethylaminoneopentyl acrylate and dimethylaminoneopentyl methacrylate. The basic acrylates and methacrylates are used in the form of the salts with strong mineral acids, sulfonic acids or carboxylic acids, or in quaternized form. The anion $X^-$ for the compounds of the formula I is the acid radical of the mineral acids or of the carboxylic acids, or methosulfate, ethosulfate or halide from a quaternizing agent.

Further water-soluble monomers of group (a) are N-vinylpyrrolidone, acrylamidopropanesulfonic acid, vinylphosphonic acid and/or alkali metal or ammonium salts of vinylsulfonic acid. The other acids may likewise be used in the polymerization either in non-neutralized form or in partially, or up to 100%, neutralized form. Suitable water-soluble monomers of group (a) are also diallylammonium compounds such as dimethyldiallylammonium chloride, diethyldiallylammonium chloride or diallylpiperidinium bromide, N-vinylimidazolium compounds such as salts or quaternization products of N-vinylimidazole and 1-vinyl-2-methylimidazole, and N-vinylimidazolines, such as N-vinylimidazoline, 1-vinyl-2-methylimidazoline, 1-vinyl-2-ethylimidazoline or 1-vinyl-2-n-propylimidazoline, each of which are likewise used in the polymerization in quaternized form or as a salt.

Preferred monomers of group (a) are acrylic acid, methacrylic acid and the alkali metal or ammonium salts of these acids, acrylamide and/or methacrylamide. These monomers may be copolymerized with one another in any ratio.

The monomers of group (a) are polymerized in the presence of crosslinkers (monomers of group (b)). The crosslinkers comprise at least two ethylenically unsaturated double bonds.

Suitable crosslinkers are, for example, N,N'-methylenebisacrylamide, polyethylene glycol diacrylates and polyethylene glycol dimethacrylates, which each derive from polyethylene glycols of molecular weight of from 126 to 8500, preferably from 400 to 2000, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, polyhydric alcohols, such as glycerol or pentaerythritol, di- or triesterified with acrylic acid or methacrylic acid, triallylamine, tetraallylethylenediamine, divinylbenzene, diallyl phthalate, polyethylene glycol divinyl ethers of polyethylene glycols of molecular weight of from 126 to 4000, trimethylolpropane diallyl ether, butanediol divinyl ether, pentaerythritol triallyl ether and/or divinylethyleneurea. Preference is given to using water-soluble crosslinkers, for example N,N-methylenebisacrylamide, polyethylene glycol diacrylate, polyethylene glycol dimethacrylate, pentaerythritol triallyl ether and/or divinylurea. The monomers of group (b) are used in the copolymerization in amounts of from 0.001 to 5 mol %, preferably from 0.005 to 0.5 mol %, based on the monomers (a).

When a change in the properties of the copolymers is desired, the copolymerization of the monomers of groups (a) and (b) may be carried out additionally in the presence of monomers of group (c). Useful monomers of group (c) are, for example, hydroxyethyl acrylate, hydroxypropyl acrylate, hydroxyethyl methacrylate, hydroxypropyl methacrylate, acrylonitrile and/or methacrylonitrile. Also suitable are esters of acrylic acid or methacrylic acid with monohydric alcohols comprising from 1 to 18 carbon atoms, for example methyl acrylate, ethyl acrylate, propyl acrylate, isopropyl acrylate, n-butyl acrylate, isobutyl acrylate, hexyl acrylate, 2-ethylhexyl acrylate, stearyl acrylate, the corresponding esters of methacrylic acid, diethyl fumarate, diethyl maleate, dimethyl maleate, dibutyl maleate, vinyl acetate and vinyl propionate. When the monomers of group (c) are used to modify the water-soluble poly(meth)acrylates, from 0.5 to 20 mol %, preferably from 2 to 10 mol %, based on the monomers (a), is used.

The water-insoluble monomers may, if they are also used in the copolymerization, be distributed finely in the aqueous solution with the aid of emulsifiers. Suitable emulsifiers are, for example, ethoxylated nonylphenols, ethoxylated castor oil, alkyl sulfates, sorbitan fatty acid esters, ethoxylated sorbitols, ethoxylated sorbitan fatty acid esters and alkylsulfonates.

Such emulsifiers are used in an amount of from 0 to 3% by weight, based on the monomers (a).

The polymerization may if appropriate be effected in the presence of the customary polymerization regulators. Suitable polymerization regulators are, for example, thio compounds, such as thioglycolic acid, mercapto alcohols, e.g. 2-mercaptoethanol, mercaptopropanol and mercaptobutanol, dodecyl mercaptan, formic acid, ammonia and amines, e.g. ethanolamine, diethanolamine, triethanolamine, triethylamine, morpholine and piperidine.

The monomers (a), (b) and, if appropriate, (c) are copolymerized with one another in from 20 to 80% by weight, preferably from 20 to 50% by weight, in particular from 30 to 45% by weight, aqueous solution, in the presence of polymerization initiators. The polymerization initiators used may be any compounds which decompose to radicals under the polymerization conditions, for example peroxides, hydroperoxides, hydrogen peroxide, persulfates, azo compounds and what are known as redox catalysts. Preference is given to using water-soluble catalysts. In some cases, it is advantageous to use mixtures of different polymerization initiators, for example mixtures of hydrogen peroxide and sodium peroxodisulfate or potassium peroxodisulfate. Mixtures of hydrogen peroxide and sodium peroxodisulfate may be used in any ratio. Suitable organic peroxides are, for example, acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, tert-butyl per-3,5,5-trimethylhexanoate and tert-amyl perneodecanoate. Further suitable polymerization initiators are azo initiators, e.g. 2,2'-azobis(2-amidinopropane)dihydrochloride, 2,2'-azobis(N,N-dimethylene)iso-butyramidine dihydrochloride, 2-(carbamoylazo)isobutyronitrile and 4,4'-azobis(4-cyanovaleric acid). The polymerization initiators mentioned are used in customary amounts, for example in amounts of from 0.01 to 5 mol %, preferably from 0.1 to 2 mol %, based on the monomers to be polymerized.

The redox catalysts comprise, as the oxidizing component, at least one of the above-specified "per" compounds and, as the reducing component, for example, ascorbic acid, glucose, sorbose, ammonium or alkali metal hydrogensulfite, sulfite, thiosulfate, hyposulfite, pyrosulfite or sulfide, metal salts such as iron(II) ions or silver ions, or sodium hydroxymethylsulfoxylate. The reducing component of the redox catalyst is preferably ascorbic acid or sodium pyrosulfite. Based on the amount of monomers used in the polymerization, from $1 \cdot 10^{-5}$ to 1 mol % of the reducing component of the redox catalyst system and from $1 \cdot 10^{-5}$ to 5 mol % of the oxidizing component of the redox catalyst are used. Instead of the oxidizing component of the redox catalyst, or in addition, it is also possible to use one or more water-soluble azo initiators.

In the process according to the invention, preference is given to using a redox system consisting of hydrogen peroxide, sodium peroxodisulfate and ascorbic acid. In a customary embodiment, these components are used in the concentrations $1 \cdot 10^{-2}$ mol % of hydrogen peroxide, 0.084 mol % of sodium peroxodisulfate and $2.5 \cdot 10^{-3}$ mol % of ascorbic acid, based on the monomers.

The aqueous monomer solution may comprise the initiator in dissolved or dispersed form. However, the initiators may also be fed to the mixing kneader separately from the monomer solution.

Before the polymerization, the monomer solution is preferably freed of residual oxygen. This is done by means of inert gas which can be introduced in cocurrent, countercurrent or intermediate angles of introduction. Good mixing can be achieved, for example, with jets, static or dynamic mixers, or bubble columns.

Additives which are fed to the reaction are, for example, water-soluble, monoethylenically unsaturated monomers, further monomers comprising at least two polymerizable groups or further water-insoluble monoethylenically unsaturated monomers as have already been described above. The additives may also be organic or inorganic solvents. The at least one additive is more preferably the already fully crosslinked finely divided polymer as a granule or as a powder; this pulverulent solid is referred to as fines.

The at least one additive is metered in by means of a screw. This makes possible fine metered addition. In addition, the screw allows, when the screw channel is filled fully, sealing of the reactor from the environment. This sealing enables operation of the reactor at a pressure which deviates from ambient pressure. The pressure in the reactor is preferably slightly lower than the ambient pressure. This slight reduced pressure results from the drawing of gases which are formed in the reaction out of the reactor. The sealing prevents gases present in the reactor from being released to the environment, which leads to a decrease in the pressure in the reactor. Moreover, the sealing prevents extraneous substances from getting into the reactor from the environment. Especially in the course of metered addition of the crosslinked finely divided polymer, penetration of steam from the reactor into the screw is to be prevented since the crosslinked finely divided polymer is highly hygroscopic, expands greatly on water uptake and forms lumps and can thus lead to blockage of the screw.

In order to prevent dead spaces in which the crosslinked finely divided polymer can accumulate and cake, the screw ends substantially flush with the inner wall of the reactor interior.

Substantially flush means that no parts of the screw protrude into the agitation area of the kneading shafts, and the end of the screw, i.e. the screw tip or the last convolution (if the screw is designed without a screw tip) extends at most 1D outside of the reactor wall.

A further advantage of the inventive solution, in which the screw ends substantially flush with the inner wall of the reactor chamber, is that the at least one additive added is added directly into the reaction region.

In a preferred embodiment, the screw is a self-cleaning double screw. Self-cleaning prevents material from the reactor from getting into the screw and accumulating there. Self-cleaning is achieved by virtue of the double screw intermeshing. Both lightly intermeshing and deeply intermeshing screws are suitable.

The double screw may be designed either in corotating or counterrotating form. The double screw is preferably corotating. The double screw may be designed in any desired flight ratio. Also possible is any desired flight depth realizable by those skilled in the art and gradient of the screw. The flight depth and the gradient are preferably selected such that the additive metered into the reactor with the screw does not run out of the screw in an uncontrolled manner, but rather can be fed in a controlled amount by virtue of the rotation of the screw. Controlled addition requires a screw channel filled fully in the region of the addition orifice into the reactor.

In a preferred embodiment, the ratio of length to diameter of the screw (L/D ratio) is from 10 to 20; the L/D ratio is preferably from 12 to 17.

The length of the screw for feeding the at least one additive is preferably selected such that the flow of the additive into the reactor is made uniform even when the screw is not filled fully. The uniformization allows the additive to be fed continuously or discontinuously to the screw and, independently of the charging of the apparatus for adding the at least one additive, a constant flow of the additive always to be fed to the reactor.

In order to prevent oxygen from being introduced into the reaction chamber with the at least one additive fed, it is possible in a preferred embodiment to flood the apparatus with an inert gas. The inert gases used may independently be nitrogen, a noble gas such as argon, carbon monoxide, carbon dioxide, sulfur hexafluoride or mixtures of these gases. Preference is given to using nitrogen as the inert gas. The inert gas can be fed, for example, via an addition channel, by means of which the apparatus is also charged with the additive. In a further embodiment, it is possible to add the inert gas directly into the screw channel of the apparatus or, on the transmission side, via a seal with which the screw is sealed from the transmission.

The screw in the apparatus for adding the at least one additive is driven preferably with an electric motor and an infinitely variable transmission. The infinitely variable transmission allows any desired rotary speed of the screws to be achieved, as a result of which the amount of the additive metered in is adjustable exactly. The screw is preferably mounted on one side, on the side on which the drive is mounted. The screw is centered generally by means of the fill level. For this reason, the centering of the screw requires a minimum level of filling. This is generally from one to two flights.

The reactor in which the finely divided, crosslinked polymer is prepared is preferably a kneading reactor. Suitable kneading reactors comprise generally two shafts arranged in parallel alongside one another. On the surfaces of the shafts are generally mounted kneading bars on elements. These are enclosed by a casing in which at least one orifice above the shafts and at least one orifice for product removal have been formed, the shafts having been mounted at both ends so as to be rotatable at the same or different speeds and in the same or opposite sense and being driven at least one end.

In a kneading reactor with two shafts, one shaft is designated as the main shaft and the second shaft as the cleaning shaft. Both on the main shaft and on the cleaning shaft, kneading bars are arranged which may have any desired suitable shape. The number of kneading bars distributed over the periphery on the main shaft can differ from that on the cleaning shaft. In the case of a different number of kneading bars on main shaft and cleaning shaft, they are driven at different rotary speeds. In this case, the cleaning shaft designated is that shaft which has fewer kneading bars distributed over the periphery and rotates more rapidly. The rotary speed ratio depends upon the ratio of the number of kneading bars, as described, for example, in EP-A 0 517 068. The shafts can be driven either in a corotating or counter-rotating manner.

The apparatus for adding additives may convey into the reactor from any direction, for example laterally, at any angle to the vertical, to the cleaning shaft or to the main shaft. The angle at which the at least one screw conveys the at least one additive into the reactor is preferably an angle in the range from 0 to 90°. The apparatus for adding the at least one additive is more preferably arranged on the reactor such that the at least one screw conveys the at least one additive into the reactor vertically from the top. In the case of an only partly filled reactor, this has the particular advantage that the additive is fed into a free zone in the reactor. A free zone is understood to mean the region in the reactor which is not filled with the reaction product. In a kneading reactor, the free zone is the zone in the reactor in which, owing to the rotation of the shafts of the kneading reactor, a turbulent layer forms. The metered addition to the turbulent layer results immediately in good mixing of the additive with the substances which are already present in the reactor.

The at least one additive is more preferably fed in a region of maximum mixing. As a result, homogeneous mixing of the reactor contents with the additive is achieved after only a short time.

When a kneading reactor with two shafts is used, the screw for conveying the at least one additive is arranged vertically between the shaft axes of the kneading reactor. As a result, the additive is fed directly in the region in which the kneading bars of the shafts intermesh, so that good mixing of the reactor contents with the at least one additive is achieved.

In a preferred embodiment, the apparatus for feeding the at least one additive is arranged in the second or third quarter of the reactor based on the reactor length in the direction parallel to the shaft axes.

In kneading reactors, in a preferred embodiment, at least one orifice above the shafts is formed as a dome in the casing. In the kneading reactors known from the prior art, the product can accumulate and cake in the dome. These caked lumps lead, as soon as they leave the dome and get back into the kneading reactor, to increased shear stress on the kneading bars and on the shafts. In order to prevent the caked lumps and deposits, the at least one orifice above the shafts can be closed by a displacer whose side facing the shafts is designed such that, between the displacer and the kneading bars of the shafts, a gap is formed whose gap width preferably corresponds at most to the continuous gap width between kneading bars and casing. The displacer is preferably designed in such a way that it is accommodated by the orifice above the shafts in a precisely fitting manner by means of a push fit, so that the formation of dead zones between the orifice above the shafts and the displacer is prevented.

In a preferred embodiment, the apparatus for adding the at least one additive is accommodated in the displacer with which the dome above the shafts in the reactor wall is sealed. This enables the apparatus for adding, for example, to be removed from the reactor for cleaning in a simple manner by removing the displacer. The orifice in the reactor wall may also be sealed by a displacer without an apparatus for feeding the at least one additive when no addition of additives is required.

In a preferred embodiment, the apparatus for adding the at least one additive is charged with the at least one additive via a lateral addition channel. The lateral addition channel is preferably arranged inclined at an angle of from 10° to 50°, more preferably at an angle of from 20° to 40° and in particular at an angle of from 25° to 35° to the screw. The inclination of the addition channel ensures that the additive added passes into the apparatus and does not come to rest in the addition channel and block it. The apparatus for adding the at least one additive is charged preferably with a metering unit. Suitable metering units are, for example, a star feeder, a metering flap or any other metering unit known to those skilled in the art.

The screw may be designed as a hollow screw or as a solid screw. The advantage of a hollow screw is its lower weight in comparison to a solid screw and the possibility of controlling the temperature of the screw from inside; the advantage of a solid screw is its greater stability, especially the greater fracture resistance.

Moreover, the screw may have a one-piece design or be composed of a plurality of elements. The screw preferably has a one-piece design. Suitable materials for the screw are all highly alloyed austenitic steels, ferritic-austenitic duplex materials, nickel-based alloys and titanium. In the selection of the suitable material, it should be ensured that the material is stable toward the pH values occurring in poly(meth)acrylate preparation in the range from 3 to 10, preferably from 5 to 7. Preferred material for the screw are highly alloyed austenitic steels, more preferably St 1.4112.

So that the reactor is not damaged in the event of fracture of the screw, the apparatus for feeding the at least one additive is preferably equipped with a fracture safeguard. In a first embodiment, the fracture safeguard accommodated between the screw and the reactor is a pin against which the screw falls in the event of fracture. In a second embodiment, the fracture safeguard in the interior of the screw is a pin, by means of which a spring is prestressed with the weight of the screw in such a way that, in the event of part of the screw breaking off, the pin, owing to the low weight of the screw, as a result of the spring force of the prestressed spring, impacts against a sensor by means of which the reactor is stopped.

As well as the addition of an individual additive, it is also possible to feed the reactor simultaneously with a plurality of additives with one apparatus. In this case, each additive is preferably fed via a separate addition channel. The additives may have the same or different states of matter. When the additives have different states of matter, for example one liquid and one solid additive, the addition channel via which the apparatus is charged with the solid additive is preferably arranged above the addition channel via which the apparatus is charged with the at least one liquid additive.

The screw in the apparatus for adding the at least one additive is preferably designed such that it conveys the additive continuously. However, discontinuous operation is also possible. Even when the at least one additive is conveyed discontinuously, the screw is preferably operated continuously. In order to achieve discontinuous conveying of the at least one additive, it is fed discontinuously via the metering unit.

As well as the addition of a plurality of additives via an apparatus for addition, it is also possible to provide a separate apparatus for each additive. When a kneading reactor is used, the individual apparatuses are preferably arranged successively in the axial direction of the shafts.

The invention will be illustrated in detail below with reference to a drawing. In the drawing.

Figure 1:
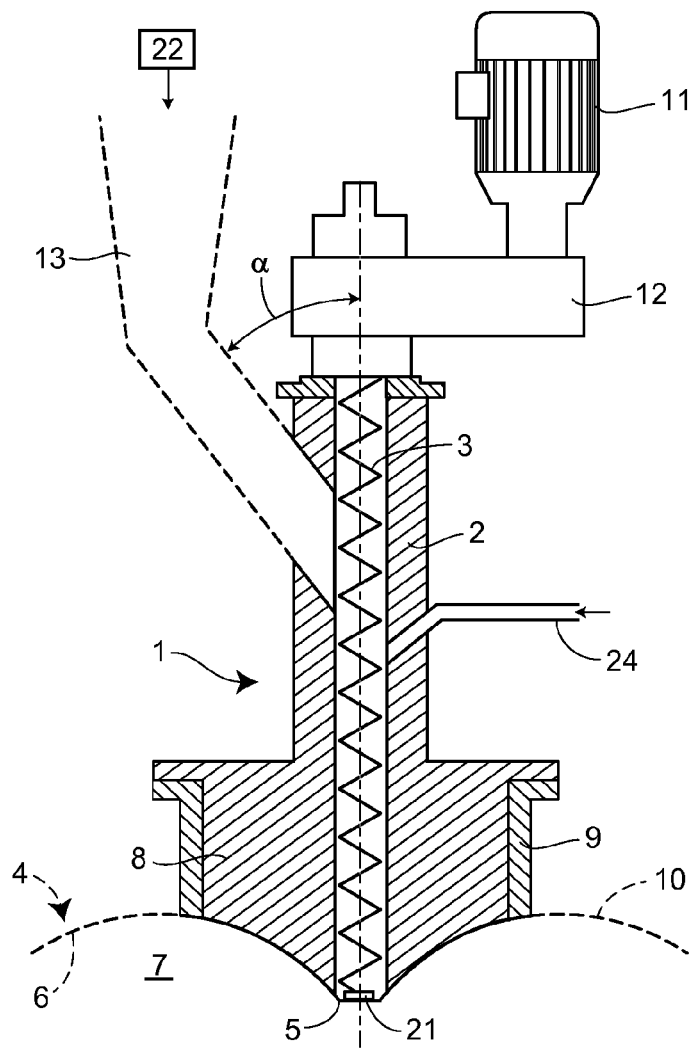
FIG. 1 shows a section through an inventive apparatus for feeding additives.
Figure 1A:
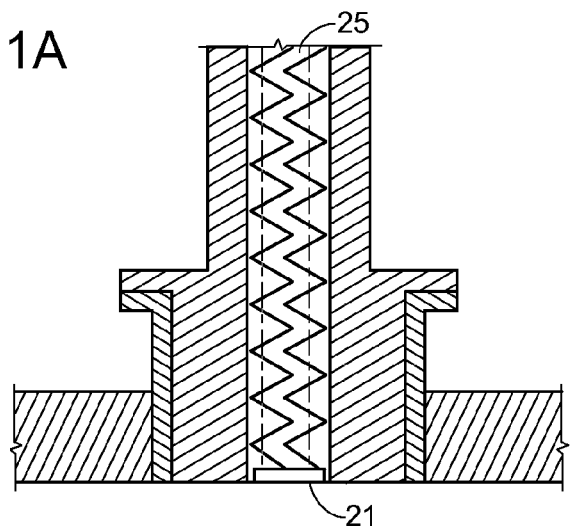
FIG. 1A shows an embodiment of the invention wherein the at least one screw is a double screw.

An apparatus 1 for feeding additives comprises a casing 2 which accommodates a screw 3. The apparatus 1 is accommodated on a kneading reactor 4 which is shown here with broken lines. The kneading reactor comprises two shafts not shown here, which are arranged parallel to one another. The screw 3 enters an addition orifice 5 and ends there substantially flush with an inner wall 6 of the reactor interior 7. In order to prevent parts of the screws from getting into the reactor interior when they are damaged, it is possible, in the region of the addition orifice 5, to provide a blocking pin 21 which is accommodated in the casing 2 such that the parts of the screw which have broken off remain lying on it in order to prevent damage to the kneading reactor 4.

The casing 2 is designed in the form of a displacer 8 which closes a dome 9 on the reactor casing 10. The displacer 8 is designed such that the side facing the kneading reactor 4 closes the kneading reactor 4 in such a way that, between the inner reactor wall 6 and the shafts of the kneading reactor 4, or between the displacer 8 and the shafts of the kneading reactor 4, a constant gap is formed.

The screw 3 is driven with an electric motor 11. This is arranged laterally beside the screw axis. A transmission 12 connects the electric motor 11 to the screw 3. The transmission 12 is preferably infinitely variable in order to be able to control the screw speed as desired.

The additive is added via an addition channel 13. The addition channel 13 is inclined at an angle α to the screw axis. The angle α is preferably in a range between 10° and 50°. This ensures that the additive which is fed via the addition channel 13, owing to gravity, moves into the screw channel of the apparatus 1. The additive is metered into the addition channel preferably by means of a metering unit.

Figure 2:
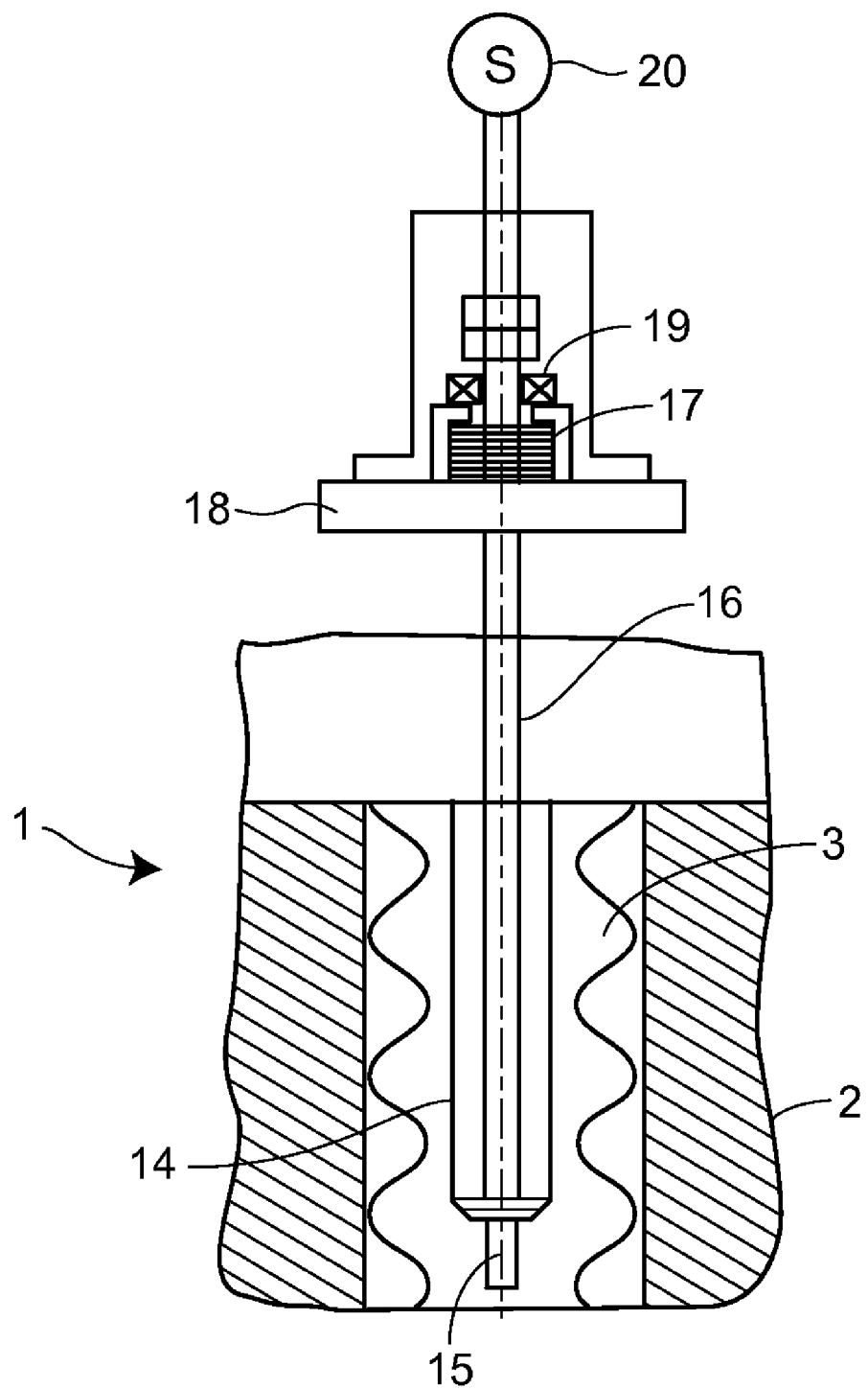
FIG. 2 shows a fracture safeguard with pin and spring.

FIG. 2 shows a schematic of a fracture safeguard with a pin and a spring. The fracture safeguard acts by means of gravity and the mass of the screw 3. There is a drillhole 14 in the screw 3. The drillhole 14 ends in a screw thread 15. A pin 16 is screwed into the screw thread 15. At the opposite end to the screw thread 15, the pin 16 acts on a spring element 17 designed as a pressure spring. The spring element 17 surrounds the pin and rests on a plate 18 mounted in a fixed manner on the casing 2 at one end and on a ring 19 secured to the pin 16 at the other end. The screw 3 is pulled downward by gravity, as a result of which the ring 19 acts on the spring element 17 and prestresses it. When part of the screw then breaks off, the mass of the screw is reduced, a smaller force acts on the spring element 17 and the pin 16 along with the screw secured to it moves in the direction of a sensor 20. As a result of the changed pressure which acts on the sensor 20, it is detected that part of the screw has broken off. The kneading reactor can be stopped and further damage is prevented.

REFERENCE NUMERAL LIST

1 Apparatus for feeding at least one additive
2 Casing
3 Screw
4 Kneading reactor
5 Addition orifice
6 Inner wall
7 Reactor interior
8 Displacer
9 Dome
10 Reactor casing
11 Electric motor
12 Transmission
13 Addition channel
14 Drillhole
15 Screw thread
16 Pin
17 Spring element
18 Plate
19 Ring
20 Sensor
21 Blocking pin
22 Metering unit
24 Liquid additive channel
25 Double screw

What is claimed is:

1. A method for adding at least one solid or viscous liquid additive, or an additive dispersed in solvent, to a reactor interior of a reactor for preparing crosslinked, finely divided polymers by copolymerizing
   (a) water-soluble, monoethylenically unsaturated monomers and
   (b) from 0.001 to 5 mol %, based on the monomers (a), of monomers comprising at least two polymerizable groups,
   (c) from 0 to 20 mol %, based on the monomers (a), of water-insoluble monoethylenically unsaturated monomers,
   wherein the at least one solid or viscous liquid additive is added by an apparatus comprising at least one screw for conveying the at least one additive and the at least one screw ends in an addition orifice substantially flush with the inner wall of the reactor interior, and
   wherein (i) between the screw and the reactor is arranged a pin against which the screw falls in the event of fracture or (ii) the interior of the screw accommodates a pin, by means of which a spring is prestressed with the weight of the screw in such a way that, in the event of part of the screw breaking off, the pin, owing to the low weight of the screw, as a result of the spring force of the prestressed spring, impacts against a sensor by means of which the reactor is stopped.

2. The method according to claim 1, wherein the at least one screw is a self-cleaning double screw.

3. The method according to claim 2, wherein the double screw is corotating.

4. The method according to claim 1, wherein the at least one screw conveys the at least one additive into the reactor vertically from the top.

5. The method according to claim 1, wherein the reactor is a kneading reactor.

6. The method according to claim 5, wherein the kneading reactor comprises two shafts arranged in parallel alongside one another.

7. The method according to claim 1, wherein the at least one additive is fed into a region of maximum mixing.

8. The method according to claim 7, wherein the screw for conveying the at least one additive is arranged vertically between the shaft axes of the kneading reactor.

9. The method according to claim 5, wherein the at least one additive is fed into a free zone in the reactor.

10. The method according to claim 5, wherein the apparatus for feeding the at least one additive is arranged in the second or third quarter of the reactor based on a reactor length in a direction parallel to the shaft axes.

11. The method according to claim 5, wherein the apparatus for feeding the at least one additive is accommodated in a displacer which closes a dome in a reactor wall.

12. The method according to claim 1, wherein the apparatus for adding the at least one additive is charged with the at least one additive via a lateral addition channel.

13. The method according to claim 12, wherein the lateral addition channel is arranged inclined at an angle of from 10° to 50° to the screw.

14. The method according to claim 12, wherein the apparatus for adding the at least one additive is charged with a metering unit.

15. The method according to claim 1, wherein a length of the screw for feeding the at least one additive is selected such that a flow of the additive into the reactor is made uniform even when the screw is not filled fully.

16. The method according to claim 1, wherein the screw with the at least one additive present therein seals the reactor from the environment.

17. The method according to claim 1, wherein the screw is flushed with an inert gas.

18. The method according to claim 1, wherein the apparatus for adding at least one additive simultaneously adds at least one solid and one liquid additive.

19. The method according to claim 18, wherein the apparatus is charged with the at least one solid additive via an addition channel which is arranged above an addition channel via which the apparatus is charged with the at least one liquid additive.

20. The method according to claim 1, wherein the at least one additive is a granule or a powder.

21. The method according to claim 1, wherein the screw is operated continuously even when the at least one additive is conveyed discontinuously.

* * * * *

UNITED STATES PATENT AND TRADEMARK OFFICE
CERTIFICATE OF CORRECTION

PATENT NO.        : 8,206,027 B2                                            Page 1 of 1
APPLICATION NO.   : 11/994138
DATED             : June 26, 2012
INVENTOR(S)       : Hillebrecht et al.

It is certified that error appears in the above-identified patent and that said Letters Patent is hereby corrected as shown below:

On the Title Page, in item (75), under "Inventors", in Column 1, Lines 4-5, delete "Belgium (NL);"
and insert -- Antwerp (BE); --, therefor.

Signed and Sealed this
Sixteenth Day of September, 2014

Michelle K. Lee
*Deputy Director of the United States Patent and Trademark Office*